US006823946B2

(12) United States Patent
Rafeld et al.

(10) Patent No.: US 6,823,946 B2
(45) Date of Patent: Nov. 30, 2004

(54) HORSE-SHOE TYPE, PLATE-SHAPED, PLASTIC HOOF FITTING

(75) Inventors: Karl Rafeld, Wildpoldsried (DE); Gene Ovnicek, Penrose, CO (US)

(73) Assignee: Cera Handelsgesellschaft mbH (DE)

( * ) Notice: Subject to any disclaimer, the term of this patent is extended or adjusted under 35 U.S.C. 154(b) by 0 days.

(21) Appl. No.: 10/343,887

(22) PCT Filed: Jul. 5, 2001

(86) PCT No.: PCT/EP01/07725
§ 371 (c)(1),
(2), (4) Date: Feb. 5, 2003

(87) PCT Pub. No.: WO02/11533
PCT Pub. Date: Feb. 14, 2002

(65) Prior Publication Data
US 2004/0011535 A1 Jan. 22, 2004

(30) Foreign Application Priority Data

| Aug. 8, 2000 | (DE) | 200 13 626 |
| Jan. 23, 2001 | (DE) | 201 01 172 |
| Jun. 7, 2001 | (DE) | 201 09 470 |

(51) Int. Cl.[7] .............................. A01L 1/00; A01L 1/02
(52) U.S. Cl. ............................................. 168/9; 168/28
(58) Field of Search .......................... 168/10, 14, 26, 168/28

(56) References Cited

U.S. PATENT DOCUMENTS

| 956,955 | A | * | 5/1910 | Fear ................................ 168/9 |
| 3,494,422 | A | * | 2/1970 | Clark ............................... 168/4 |
| 4,972,909 | A | * | 11/1990 | Rose ............................... 168/4 |
| 6,082,462 | A | * | 7/2000 | Lyden ........................... 168/24 |
| 6,116,346 | A | * | 9/2000 | Hasegawa ..................... 168/23 |
| 6,401,828 | B1 | * | 6/2002 | Rafeld ........................... 168/12 |

FOREIGN PATENT DOCUMENTS

| EP | 0 893 057 A1 | | 1/1999 | |
| EP | 0893057 A1 | * | 4/1999 | ............. A01L/5/00 |
| EP | 1 095 389 | | 5/2001 | |
| FR | 2411562 A | * | 8/1979 | ............. A01L/5/00 |
| WO | WO 99/40782 | * | 8/1999 | ............. A01L/5/00 |

* cited by examiner

Primary Examiner—Son T. Nguyen
(74) Attorney, Agent, or Firm—Gifford, Krass, Groh, Sprinkle, Anderson & Citkowski, P.C.

(57) ABSTRACT

The invention concerns a horseshoe-like, plate-configured hoof pad of plastic material having two legs that can be adapted to the size of the hoof by means of changing their distance with respect to one another. A connecting bar which can be engaged with the legs of the pad in the area of their ends is configured as surface covering, separate snug-fit-piece completing the circumference of the leg ends completely in order to connect them to each other. The connecting bar includes a circumferential configuration that fills within the leg ends back-cut-recesses in form of flat, lateral bows, wherein the snug-fit-piece can be inserted into the running surface of the leg ends which can be completely integrated in order to keep the leg ends in configurational and force transmitting connection to one another and to make the snug-fit-piece exchangeably removable from the leg ends. At least some of the profile bodies are defined by a border in order to form a depression wherein at least one hoof nail can be placed.

39 Claims, 2 Drawing Sheets

Schnitt B-B

HORSE-SHOE TYPE, PLATE-SHAPED, PLASTIC HOOF FITTING

RELATED APPLICATION

This application is a U.S. national phase application that claims priority to International Application No. PCT/EP01/07725 filed Jul. 5, 2001 that is herein incorporated by reference.

BACKGROUND OF THE INVENTION

It is known to provide hoof pads with distantly arranged legs within the frog portion of the hoof. EP 893 057 discloses such a hoof pad wherein a line of holes disposed in the hoof pad in the area of the white line of the hoof is used for attaching the pad to the hoof. This type of hoof pad is adaptable to different hoof sizes by spreading the legs of the pad to a certain extent adjacent their ends, so that one size of pad is suitable for several hoof sizes as the required size of the hoof pad can be attained by using plate-like connecting means between the ends of the legs whereby the hoof pad can be spread or, respectively, contracted so that the line of holes within the pad can be located over the respective white line of the hoof. Different connecting means are provided, such as for instance a clip, the free end of which may be continuously adjusted and attached to the adjacent other end of the clip by screwing, sticking together or welding. Moreover, crosspieces are also proposed, which are shiftable with respect to one another, for bridging the distance between the ends of the legs of the hoof pad. The crosspieces are attached to the legs with a connecting screw device.

In each case, the prior art connecting means are structured such that they only connect the ends of the legs defining the frog opening, but do not form a uniform closure of the ends of the legs. Thus, the connecting means are either asymmetrically configured with respect to the longitudinal axis of the hoof pad, covering only one of the legs or, in case of a symmetrical configuration, the connecting bars establish only a point-like connection of the ends of the legs with screws, wherein the ends are provided with screw bores corresponding to respective bores formed within the connecting bars, into which the corresponding screws are inserted.

Moreover, the known hoof pads are provided with a nap-like structure on the bottom surface, consisting of single naps connected to each other by bars the height of which is less than the height of the naps. In this manner, the hoof pad prevents the hoof from slipping or sliding on the ground surface.

It has been found out that the attachment of the hoof pad with nails requires precise adjustment of the pad on the hoof so that the nails hit the so-called white line of the hoof. This practice is time-consuming and cannot be exactly turned out because of the fact that the points of the nails often move laterally when hit with a hammer because of the flexibility of the plastic material of the pad whereby the so-called white line is missed.

The published European patent application 00 109 538.9 includes a proposal even more pertinent to the mentioned subject matter, because it describes the connection of the ends of the legs of the hoof pad by means of a connecting bar configured as a snug-fit-piece insertable into recesses within the ends of the legs in form of flat lateral bows.

SUMMARY OF THE INVENTION

The invention concerns a horseshoe-like, plate-like hoof pad of plastic material having two legs, which can be adapted to the size of the hoof by a device for changing the distance of the two legs with respect to one another, which device having the form of a connecting bar engageable with the legs of the pad within the area of their ends, which pad having a lower surface contacting the underground provided with profile elements. The connecting bar is configured as a surface covering, separate snug-fit-piece, completing essentially completely the form of the circumference of the ends of the legs in order to connect them to each other, whereas these ends are also provided with a circumferential configuration filling excesses cut into the ends of the legs in form of surface covering, lateral bows. Moreover, the snug-fit-piece can be inserted into the surface or lower face of the ends of the legs and can be essentially completely integrated therein, in order to maintain the ends of the legs connected with one another due to configuration and force and in order to replace the snug-fit-piece by removing it from the ends of the legs, wherein at least some of the profile elements are defined by an edge for the formation of a depression in each of which at least one hoof nail may be placed.

The use of the snug-fit-piece between the ends of the legs of the hoof pad causes the ends of the legs to remain fixed so that under load they do not spread to the extent they do when the connecting means for the two ends of the legs is only a narrow, straight or bent bar which is fixed to the ends of the legs. The proposed snug-fit-piece is able to connect the ends of the legs configurationally as well as symmetrically with respect to the longitudinal axis of the hoof pad. This connection means is advantageous because it counteracts the forces affecting the ends of the legs during the use of the hoof pad, which forces tend to deform the ends of the legs. Because of the special configuration of the circumference of the snug-fit-piece the withhold forces developed by the snug-fit-piece piece are transferred into an essentially larger cross section of the ends of the legs resulting in a less stress of the material at the ends of the legs so that the connecting bar does not break under load. This is of essential importance because the deformation resistance of the plastic material under the influence of pressure and temperature is less than that of common materials for hoof pads, namely metals.

Moreover, the use of snug-fit-pieces as connecting means enables a relatively simple adaptation of the hoof pad to different size hoofs and especially to different locations of the so-called white line of the hoof, which is the only means for the reception of fastening means. Thus, by using different sizes of snug-fit-pieces, a definite size of hoof plate can be spread to a certain extent within the frog area.

Besides these apparent improvements, the proposed hoof pads may be adapted to improve health and effectiveness of the legs or hoofs, respectively, of horses particularly with regard to the natural hoof function and the anatomic structure of the horse foot, its capacity for bearing a load, its displacement of weights and force effects and load effects considering inter alia the behaviour of wild horses.

The above objective is solved according to the invention by providing the head part connecting the two legs of the pad with a flat front edge and the running surface of the pad with a running surface portion extending at both sides of the middle axis of the pad essentially to the outer edge of the legs. The running surface portion is free of profile bodies and is provided with a wedge-shaped cross section enlarged in the direction of the ends of the legs and having on the middle axis a width corresponding to about half of the width of the head portion between its front edge and its rear edge. The head portion adjacent to the running surface portion is free of profile bodies and a further running surface portion is located provided with nob-like profile bodies.

By this configuration of the hoof pad, the rolling quality of the bottom surface of the hoof pad on the ground is improved simultaneously reducing the abrasion of the pad material so that the load on the hoof and the dispersion of forces affecting the horse foot are improved such that the danger of injury to the foot bones or the horse legs, as well as pathological deformations of the bone structure, are essentially reduced even under extreme loads that are sometimes experienced by competition horses.

According to a preferred embodiment of the invention, the lifetime of the hoof pad can be improved further by putting the connecting bar after its insertion at the ends of the legs under tension and not under pressure because pressure can result in bowing the bar.

Moreover it is also advantageous to provide the running surface of the pad adjacent to the head portion connecting the two legs, with slot-like cavities extending in the direction of the width of the legs and being separated from each other by dumb-bell-like profile bodies and being able to receive the heads of hoof nails which are hammered into the so-called white line of the hoof.

Further advantageous embodiments are characterized in the sub-claims.

BRIEF DESCRIPTION OF THE DRAWINGS

The invention will be explained in further detail on the basis of the drawings in which.

DETAILED DESCRIPTION OF THE INVENTION

Figure 1:
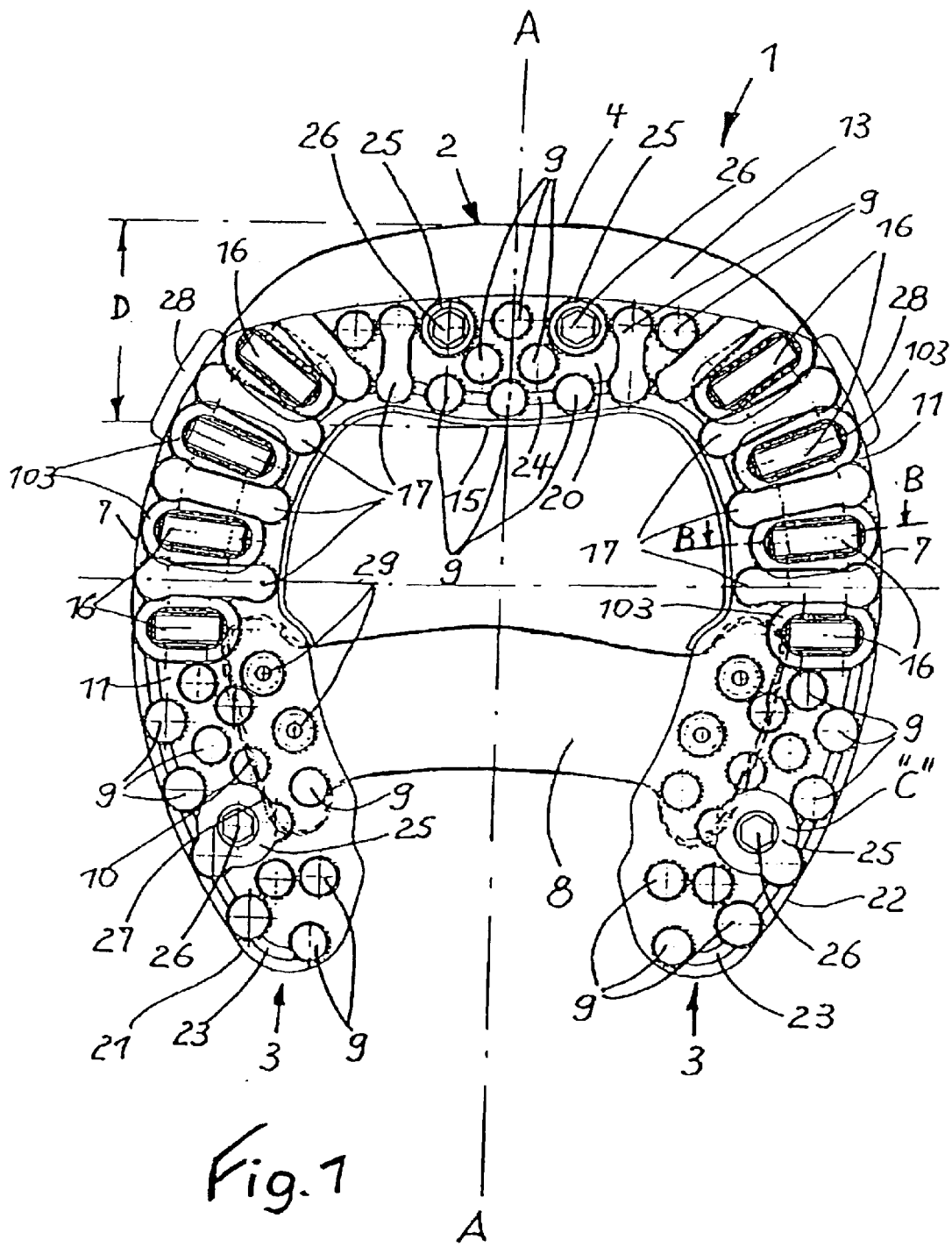
FIG. 1 is a plan view of the lower or, respectively, bottom side of the hoof pad provided with an installed snug-fit-piece.

The plate-like configured hoof pad 1 as shown in FIG. 1 comprises a hoof-shoe-like configuration having two legs 7 operative to be selectively adapted to the size of a hoof with means for changing the distance of the legs with respect to one another in form of a connecting bar 8, also called a distance piece. This connecting bar 8 can be brought into engagement with the legs 7 of the hoof in the area of the ends 3 by inserting the bulging ends of the connecting bar 8 into correspondingly configurated surface recesses of the legs 7. The pad 1 is provided with a running surface 11 covered with nob-like profile bodies 9. The connecting bar 8 is a surface covering, separate snug-fit-piece, which essentially completes the circumferential configuration of the ends 3 of the legs 7 in order to connect them to each other. The connecting bar 8 also includes a circumferential configuration 27 which fills a back-cut recess 10 in the ends of the legs 7 in form of flat lateral bows. The connecting bar 8 can be inserted into the surface or, respectively, running surface 11 of the ends 3 of the legs 7 and can be essentially completely integrated in these ends, in order to maintain the leg ends 3 connected in configurational and force transmitting respect. On the other hand, the connecting bar can be removed from the ends 3 of the legs 7 if it is necessary because of the inherent abrasion. At least some of the profile bodies 9 are configured as dumb-bell-like profile bodies 17, between which slot-like depressions 16 are provided, wherein at least one hoof nail can be placed.

Figure 2:
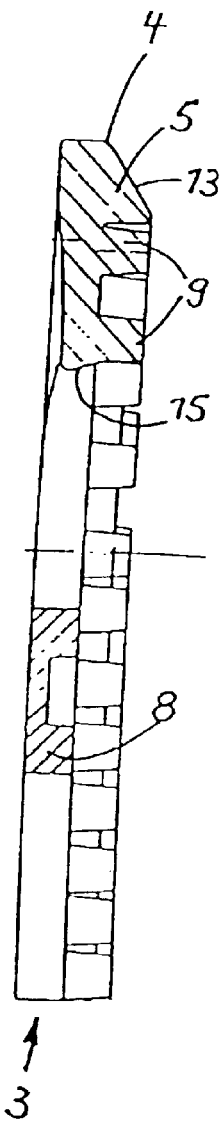
FIG. 2 is a longitudinal section view of the hoof pad of FIG. 1 along the line A—A provided with an inserted connecting bar or snug-fit-piece.

As shown in FIG. 1, the head portion 2 connecting the two legs 7 of the pad 1 is provided with a flat front side edge 4 as well as with a running surface portion 13 on the running surface 11 of the pad at both sides of the center axis A-A of the pad. The running surface portion 13 extends to the outer edge of the leg 7 and is free of profile bodies of any kind especially the noblike profile bodies 9. The running surface portion 13 is disposed with a wedge-shaped cross section 5 being emerged in the direction of the ends of the legs 7 as shown in FIG. 2. This running surface portion 13 has in the center axis A—A a width corresponding in this area of the center axis to about half of the width D of the head portion 2 in its front edge 4 and its rear edge 15. Within the head portion 2 the running surface portion 13 which is free of profile bodies is followed by a running surface portion 20 covered with nob-like profile bodies 9. On this running surface portion 20 the profile bodies 9 are located in several lines behind one another and at least partly in gaps. Those nob-like profile bodies 9 having the smallest distance from the edge 15 are connected to one another by a bar 24.

Nob-like profile bodies 9 have partly a round and partly a dumb-bell-like cross section as shown in FIG. 1, and the running surface 11 of the pad 1 following up the head portion 2 connecting the two legs 7 is provided with slot-like depressions 16 extending in the direction of the width of the legs 7 and separated from one another by the dumb-bell-like profile bodies 17. These depressions 16 receive as explained above the heads of hoof nails which are to be hammered into the so-called white line of the hoof in order to fix pad 1 with the horse hoof as a common iron hoof pad.

As can be gathered from FIG. 1, the last slot-like depression 16 in the direction of the ends 3 of the legs 7 is just in front of the connecting bar 8 so that the bar or, respectively, the leg portion carrying it is not affected.

In the area of the ends 3 of the legs 7 the running surface 11 is provided with nob-like profile bodies 9 dispersed over the width and length of the legs 7. This arrangement being such that these profile bodies are arranged away from the slot-like depressions 16 or, respectively, dumb-bell-like profile bodies 17 in the direction toward the ends 3 of the legs 7.

In order to stabilize those profile bodies 9 located at the outer edges 21, 22 of the pad they are connected to each other by a bar 23 similar to the bar 24 at the outer edge 15 of the head portion 2. In order to avoid extreme pollution of the running surface 11, it is advantageous to slant the rear outer edge 15 as shown in FIG. 1.

Between the profile bodies 9 and 17 there are several rounded holes 25 for the reception of pins 26, which can be, if necessary, screwed into these rounded holes 25 in order to further improve the reliability of the pad during use. It has been found especially advantageous to arrange one of these rounded holes 25 on both sides of the center axis A-A of the head portion 2 of the pad and at least one further of these rounded holes 25 in each of the two leg ends 3.

The size or width, respectively, of the pad, can be adjusted by adjusting the distance of the legs 7 from one another in the manner known per se by means of separate connecting bars 8 or, respectively, snug-fit-pieces. In this manner, the dimensions of the connecting bar 8 are such that the leg ends 3 are under tension if the connecting bar is installed, because it has been found out that the leg ends 3 under pressure tend to bow the connecting bar 8 resulting possibly in an intolerable abrasion of the material, whereby the pad consisting commonly of polyurethane has to be more frequently renewed.

The connecting bar 8 can be fixed as shown at 28 in FIG. 1 to the legs 7 or, respectively, their ends 3 by screws. The lateral elements 28 on pad 1 improve its correct seat.

Figure 3:
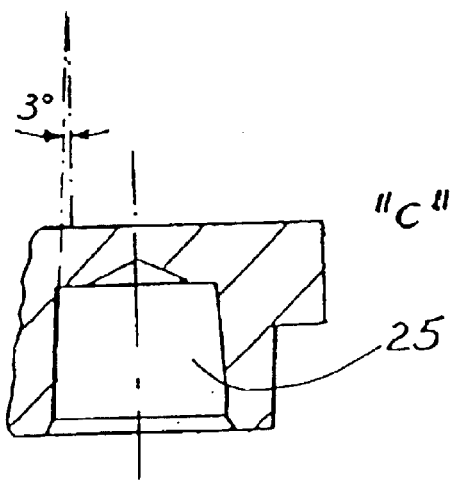
FIG. 3 is a detailed sectional view of the round hole figuration at "C" in FIG. 1.
Figure 4:
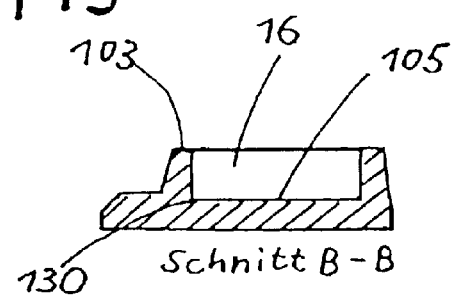
FIG. 4 is a sectional view of the legs along the line B—B in FIG. 1.

The special embodiments as shown partly in FIG. 3 and 4 are of importance with respect to the configuration of the rounded hole 25 and the slot-like depression 16.

The rounded holes 25 extend conically in the direction to the end of the hole located at the hoof. The rounded holes 25 have a smooth inner wall, and the plastic material of pad 1 is at least in the area of these rounded holes so elastic that the pin 26 may be strongly screwed into the rounded holes 25 and leave no screw-thread-prints if they are removed from the rounded holes by screwing. The elasticity module of the plastic material is in this connection 800 MPa. The taper of the rounded holes is between 2° and 5°, preferably 3°.

The inside diameter of the rounded holes 25 at their outer free end opposing the end at the hoof is thus because of the taper or conical configuration about 0.2 to 0.3 mm greater than the outside diameter of the thread portion of the pin 26.

As can be gathered from FIG. 4, the slot-like depressions 16 are provided with a bottom 105, the thickness of which is such that the white line of the hoof can be observed when clear or transparent plastic material is used to form the pad. On the white line the depressions 16 will be located into which the hoof nails are hammered if the hoof pad is fixed to the hoof.

As further shown in FIG. 4, the bottom 105 of the slot-like depressions 16 is provided with a thickness which is smaller than the thickness 103 of the plastic material surrounding these depressions. The bottom can be provided with at least one hole not shown in the drawings for the reception of the tip or, respectively, the shaft of the hoof nail. The depressions 16 are surrounded by the border 103, the height of which corresponds to the height of the head of the hoof nail so that the hoof nail head can be completely dropped in the depression. The length of the depressions 16 corresponds at least twice the length of the hoof nail head. The border 103 advantageously surrounds the depression 16 completely.

Still further, it can be seen that the slot-like depressions 16 have a conical cross section of such a kind that the upper border 103 of the depressions are outwardly extended with respect to their lower border 130 defining the bottom 105.

The slot-like or longitudinal-like depressions are at least in the front area of the pad 1 arranged on both sides of the center axis A-A in equal distances and are, as shown in FIG. 1, essentially located in the upper half of the hoof pad.

The plastic material of the pad 1 is advantageously polyurethane, but may also be a polyamide and may, if necessary, include a reinforcing material in form of glass fibers, carbon fibers, metal fibers or, respectively, threads or bodies or mixtures of these materials. In order to further improve the strength of these materials the fibers, threads and other bodies or mixtures thereof extend in the plane of the plate-like pad and thus parallel to the lower side of the hoof pad or the upper side of the hoof pad, but also inclined or rectangular to the plane of the plate-like pad. The arrangement of these fibers, threads and other bodies within the plastic material can be straight or random.

Moreover, the head portion 2 has essential advantages because of its flat front side edge 4 or, respectively, its wedge-like cross section 5 concerning the dispersion of the weight within the hoof and furthermore the stress on the tendons of the horse leg. These advantages are of great importance with respect to the recovery of sick horses with respect to their feet and leg articulations. Moreover, by these and other above mentioned characteristics of the hoof pad, the abrasion of the hoof can either be completely avoided or essentially diminished, and the shock dampening can be improved as well as the danger of injuries is reduced.

What is claimed is:

1. Horseshoe-like, plate-configured hoof pad (1) of plastic material having two legs (7) operative to be adapted to the size of a hoof by means of changing the distance between the legs (7) with respect to one another, said means being in the form of a connecting bar (8) engageable with the legs (7) of the pad adjacent leg ends (3), said pad including a running surface (11) covered by profile bodies (9), said connecting bar (8) is configured as a surface covering, separate snug-fit-piece that substantially completes a circumference of said leg ends (3) in order to connect said leg ends (3) to each other, said connecting bar having circumferential configurations (27) adapted to fill back cut recesses (10) formed within the leg ends (3), said back cut recesses (10) being formed of flat, lateral bows wherein the snug fit piece can be inserted into the said running surface (11) of the leg ends (3) wherein the snug fit piece is substantially integrated in order to keep the leg ends (3) in configurational and force transmitting connection with one another and to make the snug fit piece exchangeably removable from the leg ends (3), and wherein at least some of the profile bodies (9) are defined by a border 103 in order to form a depression operative to receive at least one hoof nail, said hoof pad (1) characterized in that a head portion (2) connecting the two legs (7) of the hoof pad (1) is provided with a flat front side (4) and a running face portion (13) on the running surface (11) of the pad (1) that extends on both sides of a center axis (A-A) of the pad (1) to an outer edge of the legs (7), said running surface portion (13) is free of nob-like profile bodies (9) and is provided with a wedge-like cross section (5) increasing in direction to the leg ends (3) in order to provide in the center axis (A-A) a width corresponding in the area of the center axis (A—A) about half of the width D of the head portion (2) between the front side edge (4) and a rear edge (15), whereas the running surface portion (13) being free of profile bodies is followed by a running portion surface portion (20) covered by nob-like profile bodies.

2. Hoof pad according to claim 1, characterized in that the nob-like profile bodies (9) are following in the direction of the leg ends (3) from the slot-like depression (16) or the dumb-bell-like profile bodies (17).

3. Hoof pad according to claim 1, characterized in that the nob-like profile bodies (9) adjacent to the outer border edges (21, 22) of the leg ends (3) are connected by a bar (23).

4. Hoof pad according to claim 1, characterized in that nob-like profile bodies (9) are dispersed on the running surface (11) in the area of the leg ends (3) that extend over the width and length of the legs (7).

5. Hoof pad according to claim 1, characterized in that the nob-like profile bodies (9) are arranged in several lines behind one another and at least partly in an alternating manner between the outer border edges (21, 22) and the center axis (A-A).

6. Hoof pad according to claim 1, characterized in that each nob-like profile body (9) is provided partly with a round cross section and partly with a dumb-bell-like cross section.

7. Hoof pad according to claim 1, characterized in that the backside border edge (15) of the head portion (2) is slanted.

8. Hoof pad according to claim 1, characterized in that those nob-like profile bodies (9) which are at nearest positioned to the rear edge (15) of the head portion (2) are connected by a bar (24).

9. Hoof pad according to claim 1, characterized in that several rounded holes (25) are located for the reception of pins (26) between the profile bodies (9, 17).

10. Hoof pad according to claim 9, characterized in that at least some of the several rounded holes (25) are arranged on both sides of the center axis (A—A) of the head portion (2) of the pad and that at least a further one of the several rounded holes (25) is located in each of the two leg ends (3).

11. Hoof pad according to claim 9, characterized in that the rounded holes (25) provide a smooth inner wall and that the plastic material of the pad (1) is at least in the area of the rounded holes is elastically resilient such that the pins (26) can be strongly screwed into the rounded holes (25) leaving no thread print upon extraction from the rounded holes.

12. Hoof pad according to claim 9, characterized in that the rounded holes (25) are conically tapering in direction to an end of the hole adjacent to the hoof tapering.

13. Hoof pad according to claim 12, characterized in that the conical configuration of the rounded holes (25) is between 2° and 5°.

14. Hoof pad according to claim 9, characterized in that the rounded holes (25) are configured as lined holes.

15. Hoof pad according to claim 9, characterized in that an elasticity module of the plastic material does not exceed 800 MPa at least in the area of the rounded holes (25).

16. Hoof pad according to claim 9, characterized in that the inside diameter of the rounded holes (25) is at an outer free end opposite to the end adjacent to the hoof is about 0.2 to 0.3 mm greater, than the outside diameter of a threaded portion of pins (26).

17. Hoof pad according to claim 1, characterized in that the running surface (11) of the pad (1) adjacent to the head portion (2) connecting two legs (7) are provided with slot-like depressions (16) extending in a direction of the width of the legs (7) and separated from one another by dumb-bell-like profile bodies (17) and adapted for the reception of the heads of hoof nails which are to be hammered into the so-called white line of the hoof.

18. Hoof pad according to claim 17, characterized in that the last slot-like depression (16) located in the direction of the leg ends (3) is arranged just in front of the connection bar (8).

19. Hoof pad according to claim 17, characterized in that the bottom (105) of the slot-like depressions (16) comprises a thickness making in case of clear or transparent plastic material the white line of the hoof visible, whereby the depressions (16) can be positioned over the white line into which the hoof nails are hammered.

20. Hoof pad according to claim 19, characterized in that the bottom (105) of the slot-like depressions (16) comprises a thickness which is smaller than a thickness at least of plastic material surrounding the depressions (16).

21. Hoof pad according to claim 19, characterized in that within the bottom (105) of the slot-like depressions (16) is provided at least one hole for the reception of a tip or a shaft of a hoof nail.

22. Hoof pad according to claim 17, characterized in that the slot-like depressions (16) are defined by a border (103).

23. Hoof pad according to claim 22, characterized in that the height of the border (103) of the slot-like depressions (16) corresponds to the height of a hoof nail head.

24. Hoof pad according to claim 22, characterized in that the border (103) is continuously surrounding the depression.

25. Hoof pad according to claim 17, characterized in that the length of the slot-like depressions (16) corresponds to at least twice the length of a hoof nail head.

26. Hoof pad according to claim 17, characterized in that the slot-like depressions (16) are arranged in equal distances on both sides of the center axis (A—A) at least in a front area of pad (1).

27. Hoof pad according to claim 17, characterized in that the slot-like depressions (16) comprise a conical cross section of a kind that the upper border (103) of the depressions is extended outwardly with respect to a lower border (130) defining the bottom (105).

28. Hoof pad according to claim 17, characterized in that the slot-like depressions (16) are located substantially or exclusively in an upper half of the hoof pad.

29. Hoof pad according to claim 1, characterized in that the connecting bar (8) is under tension when mounted in the leg ends.

30. Hoof pad according to claim 1, characterized in that the plastic material of the pad (1) is polyurethane.

31. Hoof pad according to claim 1, characterized in that the plastic material is polyamide.

32. Hoof pad according to claim 1, characterized in that the plastic material is reinforced by other material.

33. Hoof pad according to claim 32, characterized in that the reinforcing material comprises fibers, threads, bodies or mixtures thereof of glass.

34. Hoof pad according to claim 33, characterized in that the bodies have the configuration of balls.

35. Hoof pad according to claim 33, characterized in that the fibers, threads, other bodies or mixtures thereof are disorderly arranged within the plastic material.

36. Hoof pad according to claim 32, characterized in that the reinforcing material comprises fibers, threads, bodies or mixtures thereof of carbon.

37. Hoof pad according to claim 36, characterized in that the fibers, threads, other bodies or mixtures thereof are arranged in alignment within the level of the plate-like pad (1) and are parallel with respect to a lower side of the hoof or upper side of the hoof.

38. Hoof pad according to claim 32, characterized in that the reinforcing material comprises fibers, threads, bodies or mixtures thereof of metal.

39. Hoof pad according to claim 38, characterized in that the fibers, threads, other bodies or mixtures thereof are aligned in a plane inclined or rectangular to the plane of the plate-like pad (1) and are normal to a lower side of the hoof pad or upper side of the hoof pad.

* * * * *

UNITED STATES PATENT AND TRADEMARK OFFICE
CERTIFICATE OF CORRECTION

PATENT NO. : 6,823,946 B2
DATED : November 30, 2004
INVENTOR(S) : Karl Rafeld and Gene Ovnicek It is certified that error appears in the above-identified patent and that said Letters Patent is hereby corrected as shown below:

Column 2,
Line 54, "behaviour" should be replaced with -- behavior --.

Column 4,
Line 9, "noblike" should be replaced with -- nob-like --.

Column 7,
Line 17, please delete "tapering".

Signed and Sealed this

Sixth Day of September, 2005

JON W. DUDAS
*Director of the United States Patent and Trademark Office*